United States Patent
Ryu

(10) Patent No.: US 8,432,402 B2
(45) Date of Patent: Apr. 30, 2013

(54) APPARATUS FOR RETOUCHING AND DISPLAYING IMAGE AND METHOD OF CONTROLLING THE SAME

(75) Inventor: Su-jin Ryu, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1106 days.

(21) Appl. No.: 12/389,429

(22) Filed: Feb. 20, 2009

(65) Prior Publication Data

US 2009/0207177 A1    Aug. 20, 2009

(30) Foreign Application Priority Data

Feb. 20, 2008   (KR) .................. 10-2008-0015533

(51) Int. Cl.
*G06F 15/00*   (2006.01)
*G06T 1/00*    (2006.01)
*G06K 9/40*    (2006.01)

(52) U.S. Cl.
USPC .......................................... 345/501; 382/254

(58) Field of Classification Search ................ None
See application file for complete search history.

(56) References Cited

U.S. PATENT DOCUMENTS

2004/0066532 A1* 4/2004 Matsugi ................. 358/1.15
2005/0264833 A1* 12/2005 Hiraoka et al. ............ 358/1.9
2006/0055785 A1* 3/2006 Nagajima ............... 348/207.99

* cited by examiner

*Primary Examiner* — Jacinta M Crawford

(74) *Attorney, Agent, or Firm* — Drinker Biddle & Reath LLP

(57) ABSTRACT

Disclosed is an improved apparatus and method for display of retouched images. The apparatus includes a storage medium, a display unit, and an image file retouch unit. The storage medium stores a plurality of image files, including both original and retouched images. When an image is retouched, the image file retouch unit stores the retouched image and modifies the original image file to include information about the retouched image (such as name or storage location). The display unit may then display both the original image and any retouched images associated therewith.

17 Claims, 3 Drawing Sheets

APPARATUS FOR RETOUCHING AND DISPLAYING IMAGE AND METHOD OF CONTROLLING THE SAME

CROSS-REFERENCE TO RELATED PATENT APPLICATION

This application claims the benefit of Korean Patent Application No. 10-2008-0015533, filed on Feb. 20, 2008, in the Korean Intellectual Property Office, the disclosure of which is incorporated herein in its entirety by reference.

BACKGROUND OF THE INVENTION

1. Field of the Invention

The present invention relates to an apparatus for processing a digital image, a method of controlling the apparatus, and a recording medium having recorded thereon a program for executing the method, and more particularly, to an apparatus for processing a digital image and enabling a user to easily detect information about related image files, a method of controlling the apparatus, and a recording medium having recorded thereon a program for executing the method.

2. Description of the Related Art

Generally, apparatuses for processing a digital image reproduce an image file stored in a storage medium, and display an image from the image file on a display unit. A digital photographing apparatus, as one of the apparatuses, photographs an object in a photographing mode, stores an image file of the object in a storage medium, reproduces the image file stored in the storage medium, and displays an image from the image file on a display unit.

Such a digital photographing apparatus may include a function of retouching the image when the image is displayed on the display unit. The retouched image is stored in the storage medium as a separate image file that is different from the image file corresponding to the original image. Here, when the file names of image files stored in the storage medium are, for example, XXX0012.jpg, XXX0013.jpg, XXX0014.jpg, and XXX0015.jpg, and an image of XXX0013.jpg is retouched while the image of XXX0013.jpg is displayed on the display unit, the retouched image of XXX0013.jpg is stored in the storage medium under a separate file name, for example, XXX0016.jpg, which is different from the file name of the image of XXX0013.jpg. Accordingly, when the image files stored in the storage medium are reproduced and displayed one by one on the display unit, the original image of XXX0013.jpg and the retouched image of XXX0016.jpg are not sequentially displayed on the display unit. Accordingly, a user is unable to accurately compare the original image and the retouched image.

SUMMARY OF THE INVENTION

The present invention provides an apparatus for processing a digital image and enabling a user to easily detect information about related image files, and a method of controlling the apparatus.

According to an aspect of the present invention, there is provided an apparatus for processing a digital image, the apparatus including: a storage medium which stores both original image files and retouched image files; a display unit which displays at least one image from the original and retouched image files stored in the storage medium; and an image file retouch unit which retouches an image from an original image file stored in the storage medium and stores the retouched image as a retouched image file in the storage medium, wherein the image file retouch unit stores information about the retouched image file in the original image file when storing the retouched image file in the storage medium.

The image file retouch unit may store information about the number of retouched image files and an identification number of the retouched image file in the original image file when storing the retouched image file in the storage medium.

When the display unit displays the image from the original image file, the retouched image file information stored in the original image file may be displayed on the display unit.

The image file retouch unit may store information about the number of retouched image files in the original image file when storing the retouched image file in the storage medium, and the display unit may display the number of retouched image files when displaying the image from the original image file.

The image file retouch unit may store information about the identification number of the retouched image file in the original image file when storing the retouched image file in the storage medium, and the display unit may display the image from the retouched image file when displaying the image from the original image file.

The image file retouch unit may store information about the original image file in the retouched image file when storing the retouched image file in the storage medium.

The information about the original image file may include an identification number of the original image file.

According to another aspect of the present invention, there is provided a method of controlling an apparatus for processing a digital image, wherein the apparatus displays an image on a display unit from an image file stored in a storage medium, the method including: when retouching an image from an original image file stored in the storage medium and storing the retouched image as a retouched image file in the storage medium, storing information about the retouched image file in the original image file.

The information about the retouched image file may include the number of retouched image files and an identification number of the retouched image file stored in the storage medium.

The retouched image file information stored in the original image file may be displayed on the display unit when displaying the image from the original image file on the display unit.

The information about the retouched image file may include the number of retouched image files stored in the storage medium, and the number of retouched image files may be displayed on the display unit when displaying the image from the original image file on the display unit.

The information about the retouched image file may include an identification number of retouched image files stored in the storage medium, and the image from the retouched image file may be displayed on the display unit when displaying the image from the original image file on the display unit.

When retouching the image from the original image file stored in the storage medium and then storing the retouched image as the retouched image file in the storage medium, information about the original image file may be stored in the retouched image file.

The information about the original image file may include an identification number of the original image file.

According to another aspect of the present invention, there is provided a computer readable recording medium having recorded thereon a program for executing the method above.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown.

Figure 1:
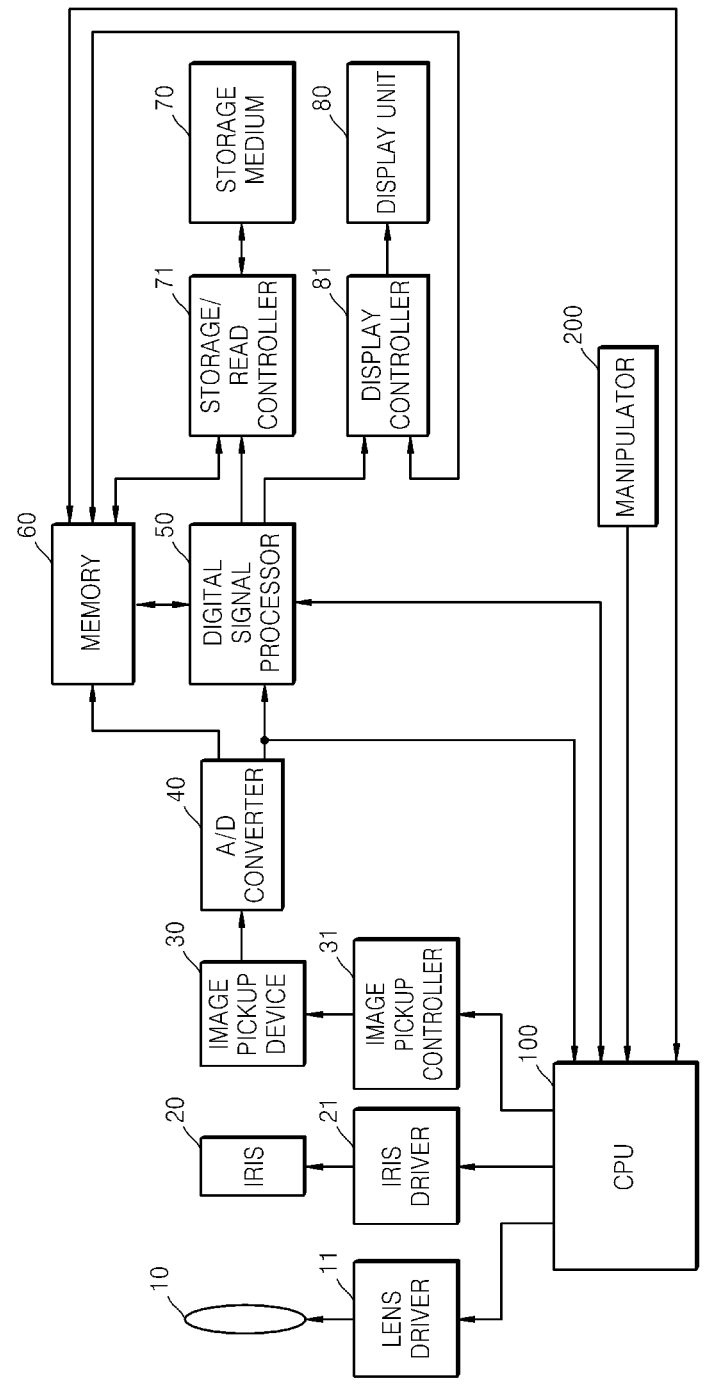
FIG. 1 is a block diagram illustrating a digital photographing apparatus according to an embodiment of the present invention.

FIG. 1 is a block diagram illustrating a digital photographing apparatus according to an embodiment of the present invention.

The entire operation of the digital photographing apparatus is controlled by a central processing unit (CPU) 100. The digital photographing apparatus includes a manipulator 200 including keys, etc. that generate an electric signal. The electric signal is transmitted from the manipulator 200 to the CPU 100, and thus the CPU 100 controls the digital photographing apparatus according to the electric signal.

When the digital photographing apparatus is in a photographing mode, the CPU 100 determines the received electric signal so as to control a lens driver 11, an iris driver 21, and an image pickup controller 31, and thus, a location of a lens 10, an opening of an iris 20, and a sensitivity of an image pickup device 30 are controlled accordingly. The image pickup device 30 generates analog data about an image from received light, and an analog-to-digital (A/D) converter 40 converts the analog data received from the image pickup device 30 to digital data. In the present embodiment, the A/D converter 40 may not be necessary according to the characteristics of the image pickup device 30.

The analog data from the image pickup device 30 may be transmitted to a digital signal processor 50 directly or via a memory 60, and may be transmitted to the CPU 100 when required. In the present embodiment, the memory 60 may be a read only memory (ROM) or a random access memory (RAM). A digital signal processor 50 may perform a digital signal process, such as gamma correction or white balance adjustment, when required.

Image data output from the digital signal processor 50 is transmitted to a display controller 81 directly or via the memory 60. The display controller 81 controls a display unit 80 so as to display an image on the display unit 80. Also, the image data output from the digital signal processor 50 is transmitted to a storage/read controller 71 directly or via the memory 60. The storage/read controller 71 stores an image file including the image data in a storage medium 70 automatically or according to a signal from a user. The storage/read controller 17 may read the image data from the image file stored in the storage medium 70, and transmit the read image data to the display controller 81 via the memory 60 or another path, so as to display an image on the display unit 80. The storage medium 70 may be detachable or un-detachable from the digital photographing apparatus.

The digital photographing apparatus according to the current embodiment of the present invention includes an image file retouch unit (not shown). In the present embodiment, an original image file means an image file stored in the storage medium 70. The image file retouch unit may be a part of or a separate element from the digital signal processor 50, or a part of another element. The image file retouch unit retouches an image from the original image file stored in the storage medium 70, and stores the retouched image as a retouched image file in the storage medium 70.

In other words, the digital photographing apparatus may apply various effects on the image from the original image file according to a signal from the user. For example, when the image from the original image file is a color image, the image file retouch unit may change the image to a black and white image. Moreover, the image file retouch unit may change a size of the image from the original image file or rotate the image from the original image file. After applying such effects to the image from the original image file, the image file retouch unit stores the retouched image in the storage medium 70 as the retouched image file. In the present embodiment, when storing the retouched image file in the storage medium 70, the image file retouch unit stores information about the retouched image file in the original image file.

For example, when the file names of image files stored in the storage medium 70 are XXX0012.jpg, XXX0013.jpg, XXX0014.jpg, and XXX0015.jpg, and an image of XXX0013.jpg, as an original image file, is retouched by the image file retouch unit while being displayed on the display unit 80, the retouched image of XXX0013.jpg is stored in the storage medium 70 as a retouched image file, and a file name of the retouched image file is XXX0016.jpg. When such a retouched image file is stored in the storage medium 70, the image file retouch unit stores information about the retouched image file in the original image file.

The information about the retouched image file may vary, and may be about the number of retouched image files related to the original image file stored in the storage medium 70. For example, when XXX0016.jpg is the only retouched image file stored in the storage medium 70 after retouching the image of XXX0013.jpg, the number of retouched image files, i.e., 1, is stored in a header of XXX0013.jpg. In the present embodiment, when XXX0015.jpg is also a retouched image file stored in the storage medium 70 by retouching the image of XXX0013.jpg, the number of retouched image files, i.e., 2, is stored in the header of XXX0013.jpg while storing XXX0016.jpg in the storage medium 70.

Figure 2:
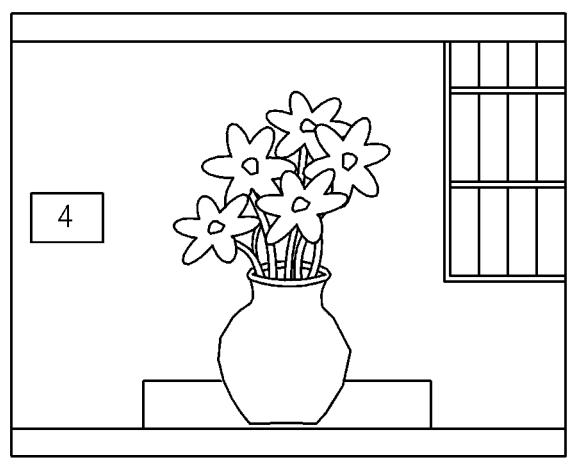
FIG. 2 illustrates an image from an original image file on a display unit of the digital photographing apparatus of FIG. 1.
Figure 3:
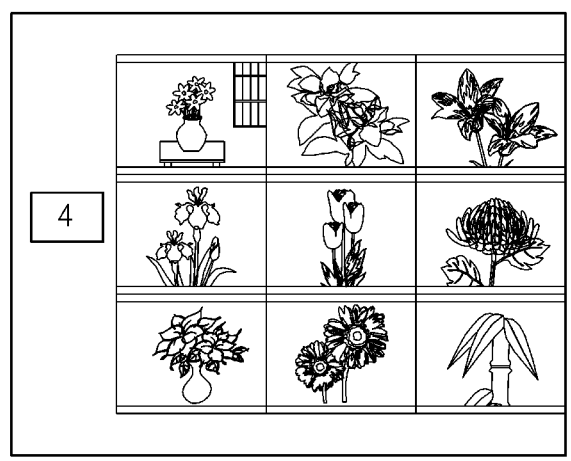
FIG. 3 illustrates images from original image files on the display unit of the digital photographing apparatus of FIG. 1.

According to the digital photographing apparatus according to the current embodiment, the information about the retouched image file may be displayed on the display unit 80 when displaying the image from the original image file on the display unit 80. For example, FIG. 2 illustrates an image from an original image file on the display unit 80 of the digital photographing apparatus of FIG. 1. Here, the number of retouched image files stored in the storage medium 70 may be displayed on the display unit 80, wherein the retouched image files are produced by retouching the image from the original image file displayed on the display unit 80. Referring to FIG. 2, "4" may mean that the number of retouched image files, stored in the storage medium 70, having the image from the original image file displayed on the display unit 80 as the original image is 4. Alternatively, "4" may mean that the number of retouched image files stored in the storage medium 70 is 3, and thus, the total number of image files including the image from the original image file is 4. Also as illustrated in FIG. 3, images (thumbnail images) of a plurality of original image files stored in the storage medium 70 may be displayed on the display unit 80, while displaying the number of retouched image files related to an image from an original image file on which a cursor is currently located on the display unit 80.

According to the digital photographing apparatus, the user easily detects the number of retouched image files related to an image from an original image file currently displayed on the display unit 80.

As described above, while the retouched image file is stored in the storage medium 70, the image file retouch unit stores the information about the retouched image file in the original image file. The information about the retouched image file may be about an identification number of the retouched image file along with the number of retouched image files stored in the storage medium 70.

For example, when the file names of image files stored in the storage medium 70 are XXX0012.jpg, XXX0013.jpg, XXX0014.jpg, and XXX0015.jpg, and an image of XXX0013.jpg, as an original image file, is retouched by the image file retouch unit while being displayed on the display unit 80, the retouched image is stored in the storage medium 70 as a retouched image file, and a file name of the retouched image file is XXX0016.jpg. While storing the retouched image file in the storage medium 70, the image file retouch unit stores information about the retouched image file in the original image file. Thus, when XXX0016.jpg is the only retouched image file stored in the storage medium 70 and produced by retouching the image of XXX0013.jpg, information about the retouched image file, i.e., "1, XXX0016.jpg" is stored in a header of XXX0013.jpg. A format of the information about the retouched image file is not limited thereto and may vary, for example, "1, 0016". The same applies for the information about the retouched image file described below.

When XXX0015.jpg, which is stored in the storage medium 70, is also a retouched image file produced by retouching the image of XXX0013.jpg, the information about the retouched image file stored in the original image file before storing XXX0016.jpg in the storage medium 70 is "1, XXX0015.jpg", and when XXX0016.jpg is stored in the storage medium 70, "2, XXX0015.jpg, XXX0016.jpg" are stored in the header of XXX0013.jpg as the information about the retouched image file.

Figure 4:
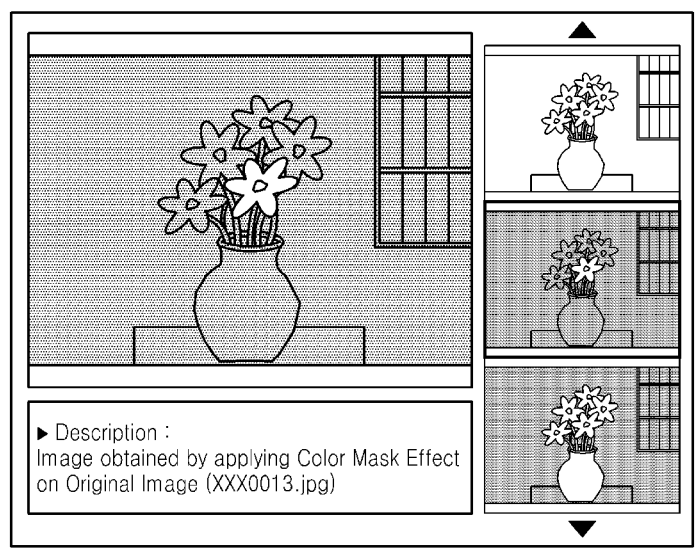
FIG. 4 illustrates an image from an original image file and image from retouched image files on the display unit of the digital photographing apparatus of FIG. 1.

As such, the information about the retouched image file may be stored in the original image file. When the original image file stored in the storage medium 70 is reproduced and the image from the original image file is displayed on the display unit 80, an image from the retouched image file may be simultaneously displayed on the display unit 80. FIG. 4 illustrates an image from an original image file and image from retouched image files on the display unit 80 of the digital photographing apparatus of FIG. 1. By simultaneously displaying the image from the original image file as an original image and the image from the retouched image files as retouched images on the display unit 80, the original image and the retouched images are compared so as to easily determine differences between the original image and the retouched images. Also, while simultaneously displaying the image from the original image file and the image from the retouched image files on the display unit 80, any one image selected by a user may be displayed relatively larger than the other images on the display unit 80, as illustrated in FIG. 4. As illustrated in FIG. 4, a description about the selected image may also be displayed on the display unit 80. In FIG. 4, the selected image is the image from the retouched image file produced by retouching the original image by applying a color mask effect so that a certain area is in color and other areas are in black and white, and the description thereof is displayed on the display unit 80. When the original image is selected, a description that the selected image is the original image is displayed on the display unit 80.

Also, when storing the retouched image file in the storage medium 70, the image file retouch unit may store information about the original image file in the retouched image file. Here, the information about the original image file may include an identification number of the original image file. For example, when the file names of image files stored in the storage medium 70 are XXX0012.jpg, XXX0013.jpg, XXX0014.jpg, and XXX0015.jpg, and an image of XXX0013.jpg, as an original image file, is retouched by the image file retouch unit while the image of XXX0013.jpg is displayed, the retouched image is stored in the storage medium 70 as a retouched image file, a file name of the retouched image file is XXX0016.jpg. When storing such a retouched image file in the storage medium 70, the image file retouch unit stores the information about the original image file, i.e., "XXX0013.jpg", in a header of the retouched image file. Here, when the retouched image file information stored in the original image file includes the number of retouched image files and the identification number of the retouched image file, such as "1, XXX0016.jpg", and the formats of the information about the first and retouched image files need to correspond with each other, the original image file information stored in the header of the retouched image file may be "0, XXX0013.jpg".

As such, when the image file retouch unit stores the information about the original image file (for example, an identification number of the original image file) in the retouched image file while storing the retouched image file in the storage medium 70, the original image file is determined based on the original image file information stored in the header of the retouched image file and corresponding information about the retouched image file is deleted from the header of the original image file, while deleting the retouched image file from the storage medium 70.

For example, when the file names of image files stored in the storage medium 70 are XXX0012.jpg, XXX0013.jpg, XXX0014.jpg, XXX0015.jpg, and XXX0016.jpg, and XXX0015.jpg and XXX0016.jpg are retouched image files produced by retouching an image from an original image file, a header of XXX0013.jpg, as the original image file, contains "2, XXX0015.jpg, XXX0016.jpg" as information about the retouched image files. Headers of XXX0015.jpg and XXX0016.jpg, which are the retouched image files, may each include information of "XXX0013.jpg". Here, when the retouched image file of XXX0015.jpg is to be deleted, the original image file information, i.e., "XXX0013.jpg", stored in the header of XXX0015.jpg is detected, and then the information about the retouched image file, i.e., "2, XXX0015.jpg, XXX0016.jpg", may be changed to "1, XXX0016.jpg". Accordingly, a complete file management is suitably performed even when the retouched image file is deleted. When the original image file is deleted, related retouched image files may be all deleted.

The above embodiments are about a digital photographing apparatus as an apparatus for processing a digital image, but the embodiments are not limited thereto. In other words, the digital photographing apparatus according to the embodiments described with reference to FIGS. 1 through 4 is an embodiment of the present invention, and an apparatus for processing a digital image of the present invention is not limited to the digital photographing apparatus. The present invention is applicable to a personal digital assistant (PDA), a mobile phone, or a computer, which can reproduce images stored in a storage medium, aside from a digital photographing apparatus which can capture and reproduce an image. Also, the structure of the digital photographing apparatus is not limited to the structures illustrated in FIG. 1.

In order to control such an apparatus for processing a digital image, a method of controlling an apparatus for processing a digital image may be used, where the apparatus displays an image from an image file stored in a storage medium on a display unit by reproducing the image file. The method includes storing information about a retouched image file in an original image file, when retouching an image from the original image file stored in a storage medium and storing the retouched image as the retouched image file in the storage medium. Here, the information about the retouched image file may be about a number of retouched image files stored in the storage medium and/or an identification number of the retouched image file. Accordingly, when displaying an image from the original image file on the display unit, the information about the retouched image file, for example, the number of retouched image files, may be displayed on the display unit. Moreover, the image from the original image file and the image from the retouched image file may be simultaneously displayed on the display unit. Information about the original image file, such as an identification number of the original image file, may also be stored in the retouched image file, when the image from the original image file stored in the storage medium is retouched and then stored in the storage medium as the retouched image file.

According to the apparatus for processing a digital image, the method of controlling the apparatus, and a computer readable recording medium having recorded thereon a program for executing the method, a user can easily detect information about related image files.

A program for executing the method in the apparatus may be stored in a recording medium. Here, the recording medium may be the storage medium 70 of FIG. 1, the memory 60 of FIG. 1, or a separate recording medium. Examples of the separate recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for retouching and displaying an image, the apparatus comprising:
   a storage medium that stores an image as an original image file;
   an image file retouch unit that receives from the storage medium the original image file and generates at least one retouched image file, and stores the at least one retouched image file in the storage medium together with the original image file; and
   a display unit that displays the image from the original image file or an image from the at least one retouched image file,
   wherein the original image file is modified to include information about the at least one retouched image file after the at least one retouched image file is stored in the storage medium.

2. The apparatus of claim 1, wherein the original image file is modified to include information comprising a total number of retouched image files that have been generated from the original image file and an identification number of the at least one retouched image file.

3. The apparatus of claim 1, wherein when the display unit displays the image from the original image file, the information about the at least one retouched image file is also displayed on the display unit.

4. The apparatus of claim 3, wherein the image file retouch unit stores information about a total number of retouched image files that have been generated from the original image file in the original image file when storing the retouched image files in the storage medium, and the display unit displays the total number when displaying the image from the original image file.

5. The apparatus of claim 3, wherein the image file retouch unit stores information about an identification number of the at least one retouched image file in the original image file when storing the at least one retouched image file in the storage medium, and the display unit displays an image from the retouched image file when displaying the image from the original image file.

6. The apparatus of claim 1, wherein the image file retouch unit stores information about the original image file in the at least one retouched image file when storing the at least one retouched image file in the storage medium.

7. The apparatus of claim 6, wherein the information about the original image file comprises an identification number of the original image file.

8. A method of controlling an apparatus for processing a digital image, wherein the apparatus displays an image on a display unit from an image file stored in a storage medium, the method comprising:
   after retouching an image from an original image file stored in the storage medium and storing a retouched image as a retouched image file in the storage medium together with the original image file, storing information about the retouched image file in the original image file.

9. The method of claim 8, wherein the information about the retouched image file comprises the number of retouched image files and an identification number of the retouched image file stored in the storage medium.

10. The method of claim 8, wherein the retouched image file information stored in the original image file is displayed on the display unit when displaying the image from the original image file on the display unit.

11. The method of claim 10, wherein the information about the retouched image file comprises the number of retouched image files stored in the storage medium, and the number of retouched image files is displayed on the display unit when displaying the image from the original image file on the display unit.

12. The method of claim 10, wherein the information about the retouched image file comprises an identification number of retouched image files stored in the storage medium, and the retouched image from the retouched image file is displayed on the display unit when displaying the image from the original image file on the display unit.

13. The method of claim 8, wherein when retouching the original image file stored in the storage medium and then storing the retouched image file in the storage medium, information about the original image file is stored in the retouched image file.

14. The method of claim 13, wherein the information about the original image file comprises an identification number of the original image file.

15. An apparatus for retouching and displaying an image, the apparatus comprising:
- a means for storing an image as an original image file;
- a means for retouching the original image file, generating at least one retouched image file, and storing the at least one retouched image in the means for storing together with the original image file; and
- a means for displaying the image from the original image file an image from the at least one retouched image file,
- wherein the original image file is modified to include information about the at least one retouched image file after the at least one retouched image file is stored in the means for storing.

16. The apparatus of claim 15, wherein the original image file is modified to include information comprising a total number of retouched image files that have been generated from the original image file and an identification number of the at least one retouched image file.

17. The apparatus of claim 15, wherein when the display unit displays the image from the original image file, the information about the at least one retouched image file is also displayed on the display unit.

\* \* \* \* \*